United States Patent [19]
Smith et al.

[11] Patent Number: 5,835,095
[45] Date of Patent: Nov. 10, 1998

[54] VISIBLE LINE PROCESSOR

[75] Inventors: Karin P. Smith; George R. Smith, Jr., both of Madison, Ala.

[73] Assignee: Intergraph Corporation, Huntsville, Ala.

[21] Appl. No.: 438,048

[22] Filed: May 8, 1995

[51] Int. Cl.$^6$ .................................................. G06T 15/40
[52] U.S. Cl. ........................................................ 345/421
[58] Field of Search .................................. 395/121, 119, 395/122; 345/421, 425

[56] References Cited

U.S. PATENT DOCUMENTS

| | | | |
|---|---|---|---|
| 3,602,702 | 8/1971 | Warnock | 345/421 |
| 3,621,214 | 11/1971 | Romney et al. | 345/421 |
| 3,736,564 | 5/1973 | Watkins | 345/421 |
| 4,594,673 | 6/1986 | Holly | 345/421 |
| 4,609,917 | 9/1986 | Shen | 345/421 |
| 4,697,178 | 9/1987 | Heckel | 345/422 |
| 5,086,496 | 2/1992 | Mulmuley | 345/421 |
| 5,113,451 | 5/1992 | Chapman et al. | 382/145 |
| 5,369,734 | 11/1994 | Suzuki et al. | 345/421 |
| 5,379,371 | 1/1995 | Usami et al. | 345/428 |
| 5,557,691 | 9/1996 | Izuta | 345/428 X |

OTHER PUBLICATIONS

Hassen et al., Thresholding Based on Learning Theory, IEEE, vol. 76, No. 10, 1379–1379–81, Oct. 1988.

Peters, "A Fast Algorithm for Plotting and Contour Filling Radiation Patterns in Three Dimensions," Antennas and Propagation, 1992 IEEE Int'l Symposium.

Tang et al., "An Efficient Hidden–Line Removal Method Based on Z–Buffer Algorithm," Image Processing, 1994 IEEE Int'l Conference, vol. 1.

Foley et al., Computer Graphics: Principles and Practice, 1990, pp. 672–697.

Gordon et al., Fast Polygon Scan Conversion with Medical Applications, IEEE Computer Graphics & Applications, v.14,n.6,pp.20–27, Nov. 1994.

Millar et al., A Hilbert Polygon Directed Raster Scan Display, Image Processing and Its Applications, pp. 357–360, 1992.

James D. Foley, Andries van Dam, Steven K. Feiner, John F. Hughes, "Computer Graphics Principles and Practice,"Second Edition Addison–Wesley Publishing Company, Inc., (Nov., 1992), pp. 649–686.

*Primary Examiner*—Anton Fetting
*Attorney, Agent, or Firm*—Philip H. Albert; Townsend and Townsend and Crew LLP

[57] ABSTRACT

Objects are represented in a coordinate space which is twice scanned by scan lines, once in one direction and then once in another direction. At each scan line, a list of line segments is generated, where each line segment represents the intersection of the projection of a polygon and the scan line. The segments are then examined to determine which are visible segments, using the z values of the end points of the segments. The visible segments of a scan line are compared to the visible segments of a previous scan line or an accumulation of visible lines, and if the end points of a visible segment taken from a polygon differ by less than a threshold amount, the lines formed between end points in one scan line and the adjacent scan line are considered to be visible lines. Where the two scans are a horizontal scan and a vertical scan, the threshold amount for vertical scans is the distance between horizontal scans and the threshold amount for horizontal scans is the distance between vertical scans.

11 Claims, 7 Drawing Sheets

VISIBLE LINE PROCESSOR

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

APPENDIX

This application incorporates an appendix which is a source code listing for several programs, which, when compiled and executed by a digital computer, create an embodiment of the present invention in the digital computer. The source code is written in the C++ language.

BACKGROUND OF THE INVENTION

The present invention relates to the field of computer graphics. More specifically, the present invention is directed to the problem of determining which lines in an image are visible and which are hidden. The invention can be used by itself or as a precursor step in an image rasterization process, wherein an image (a collection of objects defined with reference to a viewing surface) is reduced to an array of pixels each characterized by a pixel color.

The process of visible line determination is also sometimes referred to as hidden line removal or hidden line determination. Regardless of the name, the task is the same: determine which lines or segments of a line are hidden, i.e., obscured by other objects in an image. This process must be done quickly, especially where an image is part of a sequence of images or the image is complex. One of the uses of visible line determination is the generation of images which more clearly show objects by just their outlines.

FIG. 1 illustrates an example of visible line determination, showing several images representing the same two objects: a cylinder 2 and a surface 4, which is a portion of a plane. The placement of these objects is such that surface 4 cuts through cylinder 2, and from the designated view point, the image is such that cylinder 2 is visible above and below surface 4.

FIG. 1(a) is a wire frame image of the objects, in which all edges of the objects are visible. A wire frame image does not show which surfaces are in front of other surfaces. For example, point A is a point on the top circular surface of cylinder 2 and that surface could either be the outside/top side of the surface or the inside/bottom side of the surface. In this example, the visible side of the surface containing point A is the top side. Likewise, the visible surface containing point B could be either the bottom side of surface 4 or the top side. In this example, it is the top side. Also shown are points C and D. Point C is a visible point on surface 4 which obscures cylinder 2, and point D is a visible point on the front of the curved surface of cylinder 2. Although a wire frame image is simple to generate, it has the disadvantage that a viewer cannot tell which objects are solid or which objects are in front of other objects.

FIG. 1(b) is a wire frame image of the objects after they are reduced to a collection of triangles. As should be apparent, planar surface 4 is representable, exactly, by two triangles, whereas cylinder 2 cannot be represented exactly by a finite number of triangles. However, it can be adequately approximated with only a small number of triangles. In a computer memory, the objects are typically stored as parameters to mathematical functions, such as lines, vertices and curves. The wire frame image of FIG. 1(b) can be stored as a set of triangles, where each triangle is represented in memory by the coordinates in a three-dimensional space of the triangle's vertices.

FIG. 1(c) graphically shows a more efficient storage scheme for the triangles, that of triangle strips. A triangle strip is a list of three or more vertices, where the first three vertices define a triangle, the next vertex combined with the second and third vertices define the next triangle, and so on. The objects in FIG. 1 are shown in FIG. 1(c) represented by two triangle strips. In FIG. 1(c), the vertices are shown as points and one order of the vertices is shown by lines connecting the vertices. One triangle strip contains all the triangles for cylinder 2 and one triangle strip contains all the triangles for surface 4.

FIG. 1(d) graphically shows the desired result of hidden line removal. The input to a hidden line removal process is either the triangles of FIG. 1(b) or the triangle strips of FIG. 1(c). When the hidden lines are removed, the relative positions of cylinder 2 and surface 4 are more apparent. Note that, for some lines, part of the line is visible and part of the line is hidden.

FIG. 1(e) is the same as FIG. 1(d), except that lines from separate polygons from the same object are removed. In FIG. 1(e), the line separating the body of cylinder 2 from the top circular surface would be removed as well, since all the polygons on either side of the line belong to the same object. However, since the figure lacks shading or lighting information, the line was left in so as not to confuse the viewer. Another way to achieve the same effect is to have the body of the cylinder and the top surface of the cylinder designated as separate objects. The bottom surface might also be a separate object, but it would make no difference from the particular viewing point chosen.

The input to a visible line processor is a set of objects. Although the particular manner of storage of objects is not particularly relevant here, one example will be described. In this example, the physical embodiment of a set of objects is a table in an object memory, with each entry in the table containing characteristics for the object. For example, a table entry for a sphere might contain the position of its center point, its radius, and data describing how the surface of the sphere is to be colored. Of course, other alternative expressions of objects might be used, such as expressing the sphere by four points on the surface of the sphere, and the coloring information is not needed unless the processor is also going to provide image coloration.

Graphically, the set of objects can be represented (as is done in FIG. 1) by a display of the objects relative to a viewing surface and a viewing point where the objects, the view surface and the view point are all expressed by coordinates in a common coordinate system. In one arbitrary example, the coordinate system is the (x, y, z) coordinate system, the viewing point is located at (0, 0, 0), the viewing surface is a rectangle bounded by the four points (−h/2, −w/2, 1), (−h/2, w/2, 1), (h/2, w/2, 1) and (h/2, −w/2, 1) and the objects are positioned within the four rays defined by the viewing point and the four corners of the viewing surface. The objects, such as spheres, cubes, prisms, toroids, squares, circles, or more complex objects, whose size and position are described by (x,y,z) coordinates can then be easily "placed" into the coordinate space. To display the image, a graphics processor calculates which objects, or parts of objects, are visible through the viewing surface from the viewing point, following the rule that opaque objects obscure objects which are "behind" those opaque objects in the coordinate space.

In a visible line determination, lines are deemed visible if they are not obscured by any other object. Therefore, it is a simple matter to check each line against each object to see which is closest to the viewing point. In a typical graphic application, however, each object is represented by polygons. Objects with curved surfaces or edges are approximated by many polygons, and checking each line against each of many polygons is time consuming. Because each line of each polygon needs to be compared with each other line or polygon, visible line determination has been a computational problem of order $n^2$, i.e., the number of processing steps required to determine which of n line segments are visible is proportional to $n^2$. This is because each of the n line segments must be compared to each of the n line segments.

SUMMARY OF THE INVENTION

An improved visible line processor is provided by virtue of the present invention.

In one embodiment of a visible line processor according to the present invention, objects are represented by polygons, preferably triangles. Each object is labelled with an object ID, and each triangle is characterized by an object ID, as well as coordinates of the three vertices of the triangle. The object space is twice scanned by scan lines, once in one direction and then once in another direction. At each scan line, a list of line segments is generated, where each line segment represents the intersection of the projection of a polygon and the scan line. The segments are then examined to determine which are visible segments, using the z values of the end points of the segments. The visible segments of a scan line are compared to the visible segments of a previous scan line, and if the end points of a visible segment taken from a polygon differ by less than a threshold amount, the lines formed between points in one scan line and the adjacent scan line are considered to be visible lines.

Where the two scans are a horizontal scan and a vertical scan, the threshold amount for vertical scans is the distance between horizontal scans and the threshold amount for horizontal scans is the distance between vertical scans. While the scan line spacing might correspond to a pixel spacing of a display device where the image is to be displayed, the scan lines need not be so related.

In an alternate embodiment, only one scan is performed.

One specific embodiment uses, several layers of filtering to limit the number of overlapping polygons which need to be considered at each scan line. If the triangles are provided in triangle strips, the strips are ordered by their minimum extent in the scan direction, so that entire strips can be ignored until the scan line corresponding to the minimum extent is reached. The triangles remaining for consideration can be individually eliminated if their vertices indicate that they are wholly to one side of the scan line.

In some embodiments, objects are represented by multiple polygons. If the interpolygon lines are not desired, they can be easily eliminated in the visible line determination process by combining segments of the scan line which are adjacent, have matching object ID's and have common z values.

An added advantage of the present invention is the generation of plane intersection lines as a by-product. A plane intersection line is a line of penetration of two or more objects.

A further understanding of the nature and advantages of the inventions herein may be realized by reference to the remaining portions of the specification and the attached drawings.

DESCRIPTION OF THE PREFERRED EMBODIMENTS

The following description describes using the present invention to quickly determine visible lines. In these examples, the input to a visible line processor is a set of triangles, either in triangle strips or as individual triangles. For simplicity of the example, the triangles are completely opaque and viewed in a parallel projection onto the z=0 plane. As should be apparent after reading this disclosure, the methods and apparatus can be extended in a straightforward manner to handle polygons with more than three sides, as well as partially or completely transparent polygons. It should also be apparent after reading this description that the invention can also be used with overlapping two-dimensional objects by adding a third dimension to handle object overlap, and that the methods and apparatus can easily be modified to handle visible line determination for perspective projections, either directly or after transformation to a parallel projection.

As explained above, FIG. 1 shows a set of objects both with hidden lines shown and with hidden lines removed. But one advantage of hidden line removal is that the objects depicted are more easily discerned. Another advantage of hidden line removal is that less processing is needed for generating color and shading an image if all the hidden lines and objects are removed.

Figure 2:
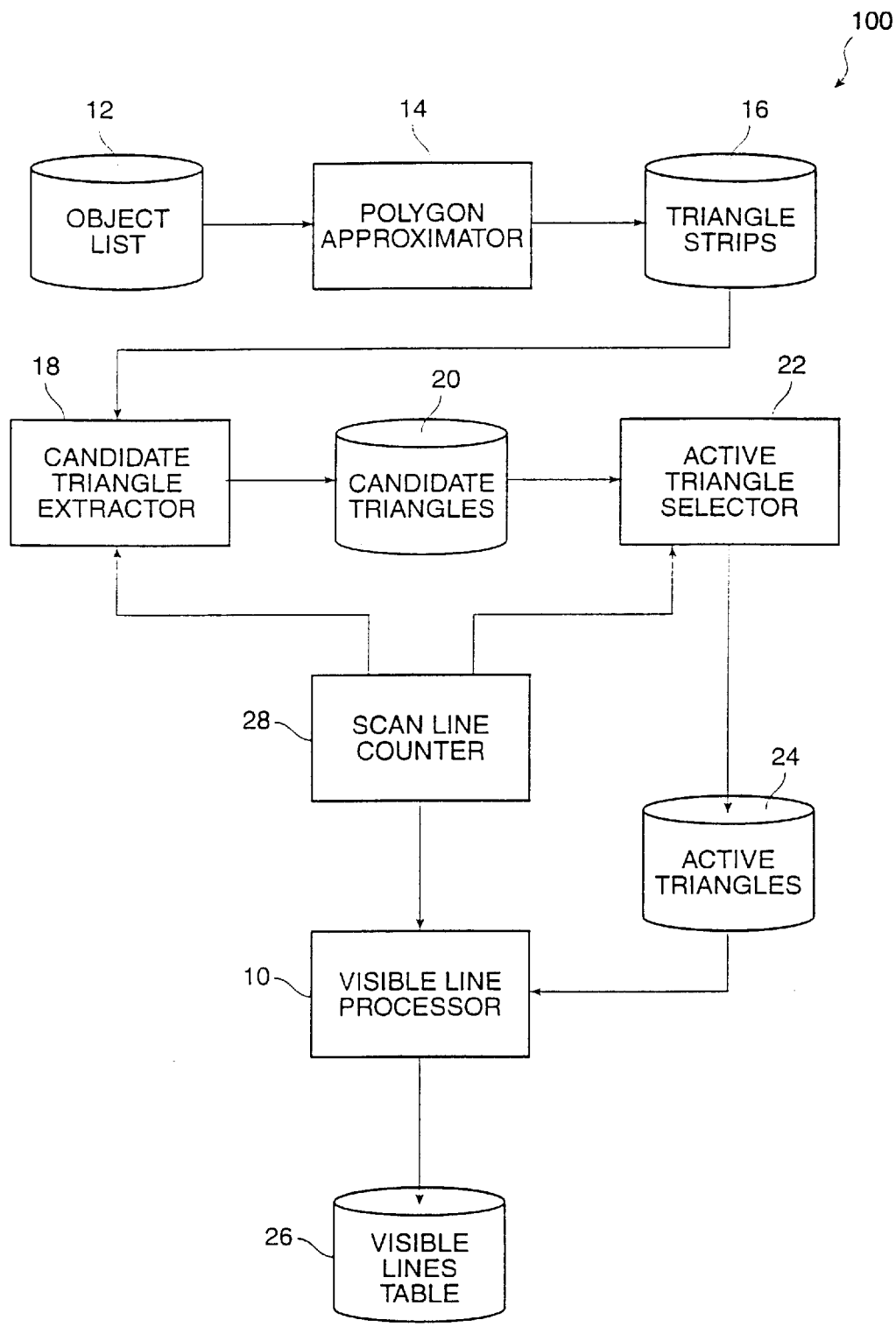
FIG. 2 is a block diagram of a graphics processing system including a visible line processor according to the present invention.

FIG. 2 is a block diagram of a graphics processing system including a visible line processor (VLP) 10 according to the present invention. VLP 10 is shown as part of a larger graphics processing system 100 which processes an object list 12 and includes a polygon approximator 14 for generating a list 16 of triangle strips, a triangle extractor 18 for separating triangle strips from list 16 into their constituent triangles and storing the triangles in a list 20 of candidate triangles, and an active triangle selector 22 for transferring triangle entries from list 20 to a list 24 of active triangles. VLP 10 operates on this list 24 of active triangles to generate a visible lines table (VLT) 26. VLP 10, triangle extractor 18 and active triangle selector 22 obtain a counter value indicating the current scan line from a scan line counter 28.

In a software embodiment, the processing apparatus (10, 14, 18, 22, 28) shown in FIG. 2 is implemented by an appropriately programmed digital computer, such as one or more microprocessors running an executable program. The lists (12, 16, 20, 24) are implemented in memory storage such as random access memory (RAM) or disk storage, or partially are implemented in read-only memory (ROM) where appropriate. In a hardware embodiment, the processing apparatus is implemented by high-speed dedicated circuits, and the lists are stored in memory contained on an integrated circuit shared with the processing circuits. Depending on memory requirements, the integrated circuit might provide all memory storage or external memory could be used as well. Whether the software embodiment is preferred over the hardware embodiment depends on factors only tangentially related to the present invention. For example, where an object list is only infrequently processed to find visible lines and weight is a critical factor, software is preferred over hardware. Where processing is done more often and speed is a primary consideration, the hardware implementation is often preferred. In a hybrid embodiment, each process of FIG. 2 is implemented by a dedicated microprocessor temporarily programmed to perform the specific function shown, thus forming a parallel processor.

Figure 3:
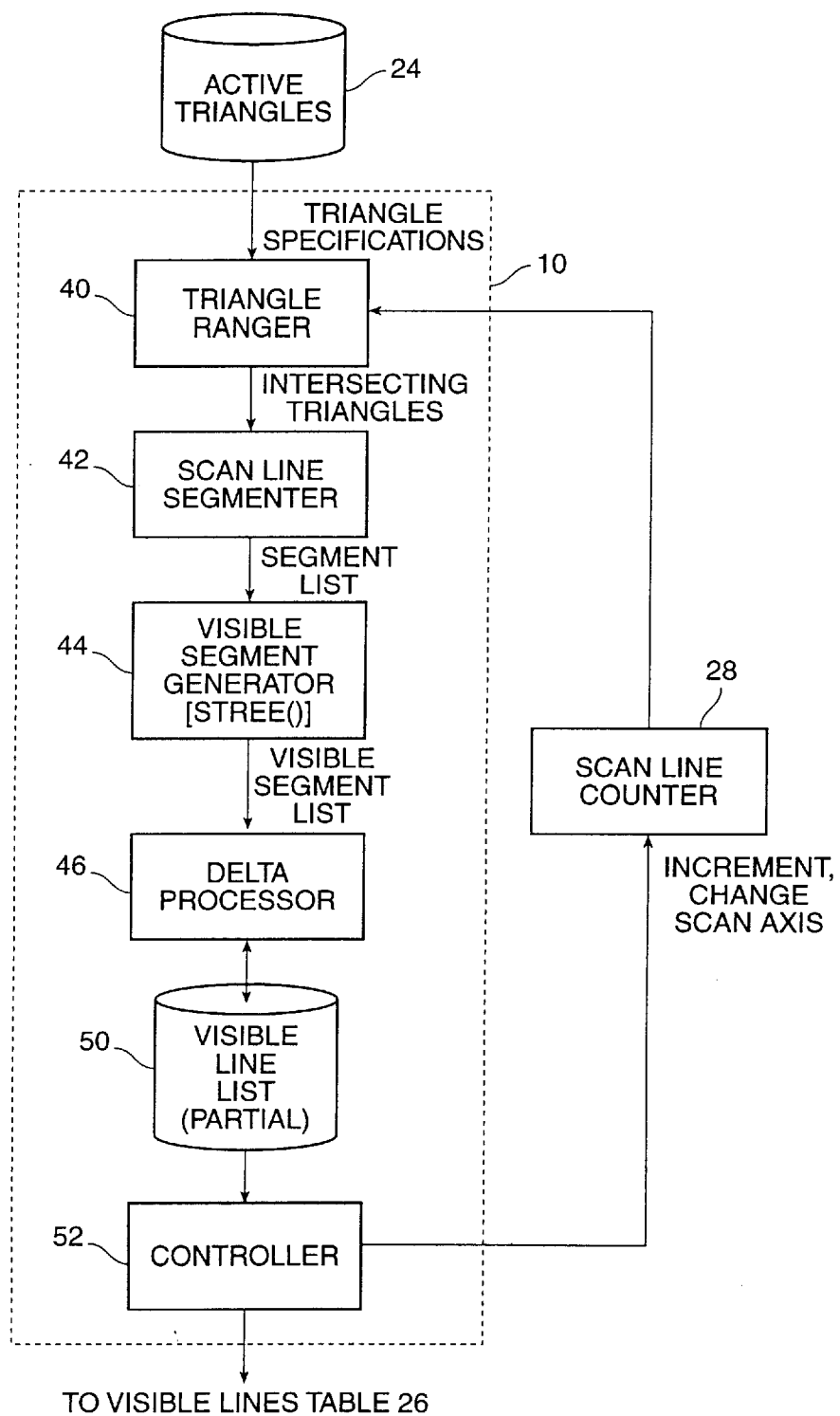
FIG. 3 shows the visible line processor of FIG. 2 in further detail.

FIG. 3 shows VLP 10 in further detail, along with list 24 of active triangles, scan line counter 28 and VLT 26. VLP 10 is shown comprising a triangle ranger 40, a scan line segmenter 42, a visible segment generator 44, a delta processor 46, a visible line list memory 50 and a scan controller 52.

Triangle ranger 40 is coupled to receive triangle specifications from list 24 and a scan line counter value from scan line counter 28. Scan line segmenter 42 is also coupled to receive the scan line counter value from scan line counter 28, as well as being coupled to receive a list of intersecting triangles from triangle ranger 40. Visible segment generator 44 is coupled to receive from scan line segmenter 42 a list of segments of triangles intersecting the current scan line (the current scan line is indicated by the scan line counter value). Delta processor 46 is coupled to receive a list of visible segments from visible segment generator 44 for a current line and the already determined visible line segments from visible line list 50. The end points of segments are used to extend the end points of lines in the visible line list, adding new lines as necessary. Scan controller 52 is coupled to scan line counter 28 to increment the scan line counter value and read out the contents of visible line list 50 to VLT 26 when the scan line counter value indicates that the scans have been completed. The operation of VLP 10 will now be described.

Figure 4A:
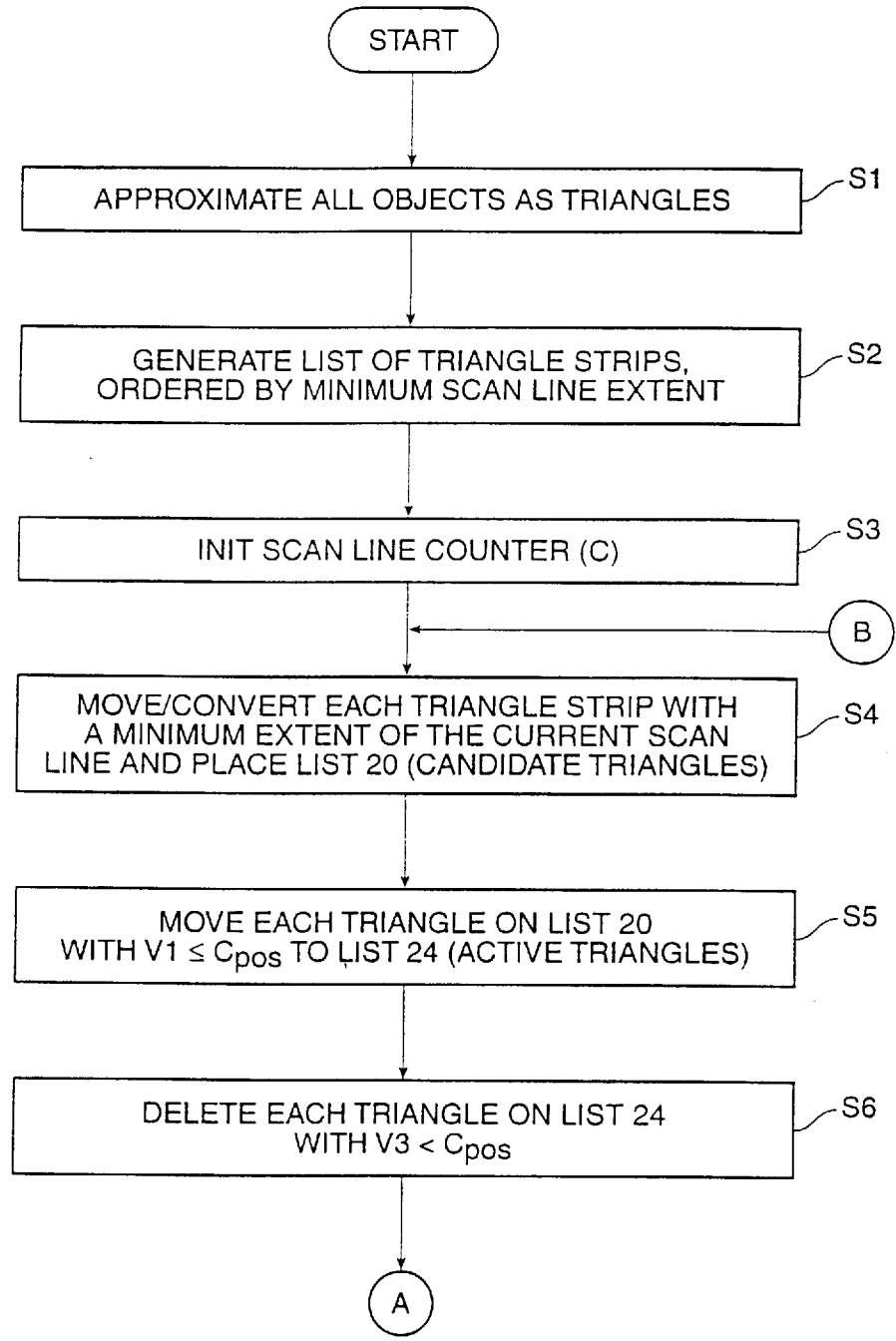
FIG. 4A and 4B is a flow chart of a process of generating a visible line table from an object table.
Figure 4B:
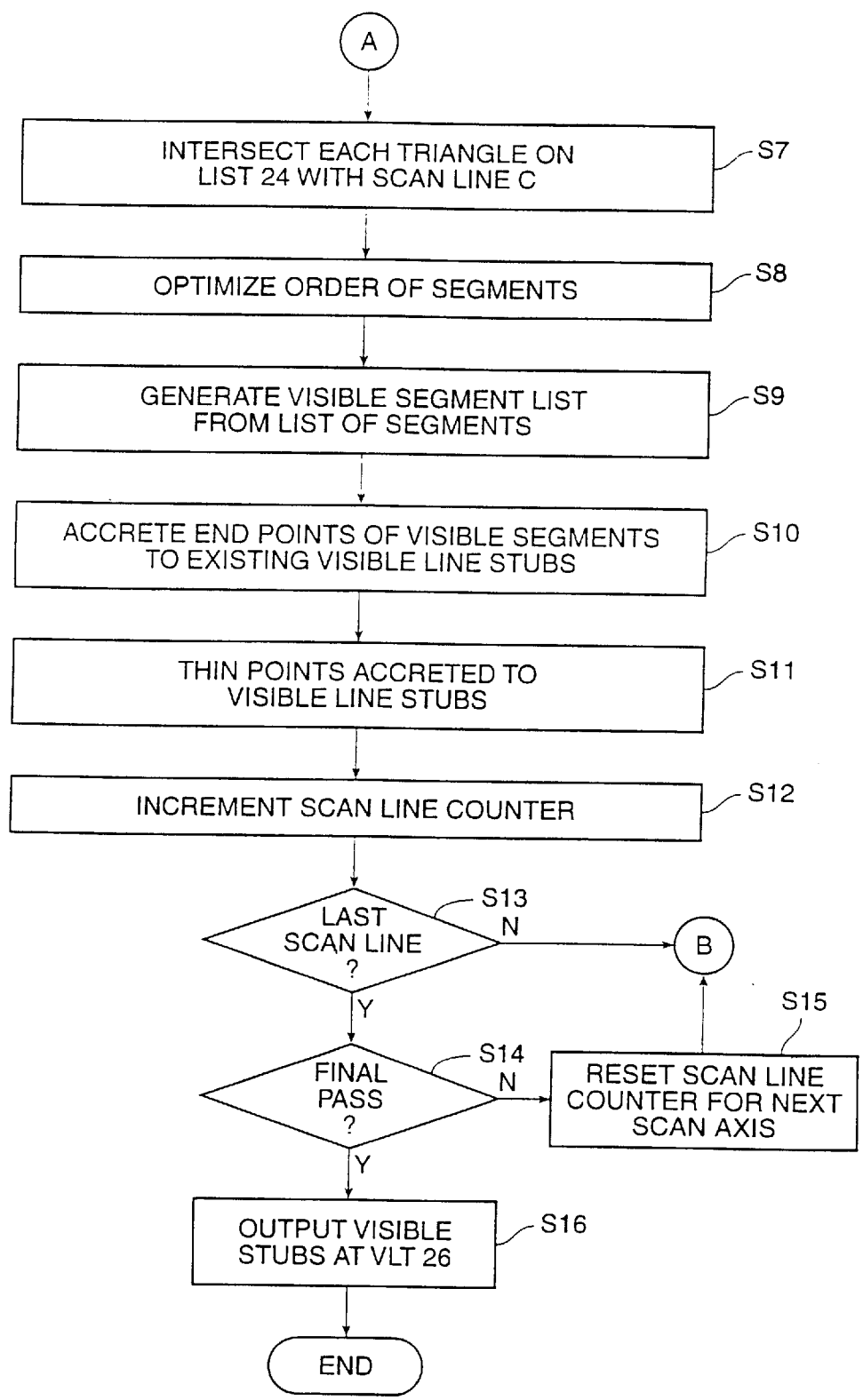

FIG. 4 is a flow chart of a process of generating a VLT from an object table. The steps of the flow chart are labelled from S1 to S16 and are each explained in detail below. The process begins with a set of objects and a scan resolution. If the apparatus of FIG. 2 is used, the set of objects is represented by object list 12. In this example, the objects are first scanned by horizontal scan lines, then by vertical scan lines. It should be apparent, however, that the order of the scans is not material and that the scans need not be exactly orthogonal so long as each visible line is picked up by at least one scan.

The scan resolution defines the spacing between each successive scan line and herein the spacing between horizontal scan lines is referred to as $\Delta h$ and the spacing between vertical scan lines is referred to as $\Delta v$. The scan resolution, while often related to a pixel resolution (e.g., one pixel per $\Delta h \times \Delta v$ rectangle), need not be so related, since the visible line table is not at the resolution of the scans but at the resolution of the original set of objects. Of course, the scan resolution does control the set of visible lines somewhat. For example, line segments smaller than the scan resolution will not appear on the visible line table, even if they are in fact visible. Where the scan resolution is close to the eventual rasterization resolution (pixel resolution), these artifacts are not apparent, but where this a large difference of magnitude, they might be visible.

In some embodiments, the visible lines are determined in a single scan, however, with two orthogonal scans, each scan can be constrained to ignore lines which are not within an orthogonal scan line width. For example, during a horizontal scan (i.e., where the image is being scanned from top to bottom with horizontal scan lines), only lines steeper than (or with slope equal to) $\Delta h/\Delta v$ need to be considered, as the other, flatter lines will be picked up in the vertical scan. One advantage to ignoring the flatter lines is that, when continuing a line based on end points, points more than $\Delta v$ away from the last end point need not be considered. Of course, the lines which are flat for the horizontal scan are steep for the vertical scan, and vice versa.

Each triangle vertex is a point in three-dimensional space, however the z coordinate need be used only for determining overlap, since the scan is done on a parallel projection. In other words, each scan line is actually a scan plane extending in the z direction as well as the direction of the scan line, and thus the end points of the line segment defined by the intersection of the scan line and a triangle are determined by the x and y coordinates of the projection.

S1: In this step, all objects are reduced to triangles (In alternate embodiments polygons with more than three sides are allowed). Manipulating a curved object, such as a sphere or cylinder, using its exact mathematical surface description often requires trigonometric transformations, which are simple when modelling one or two such shapes, but impractical with many curved surfaces or shapes or when many operations need to be done quickly. For efficient processing, curved shapes and surfaces are approximated by polygons, and typically those polygons are triangles.

Figure 1A:
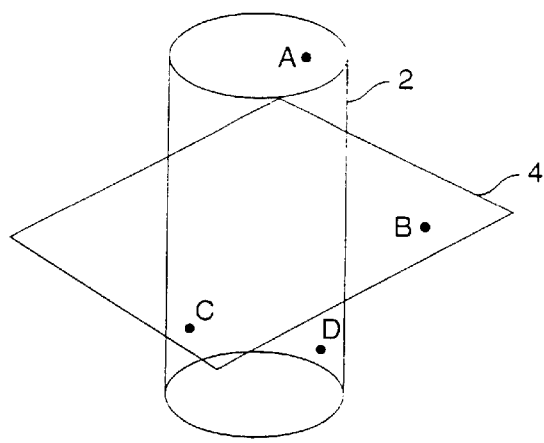
FIGS. 1(a)–(e) show various representations of an image of two objects.
Figure 1B:
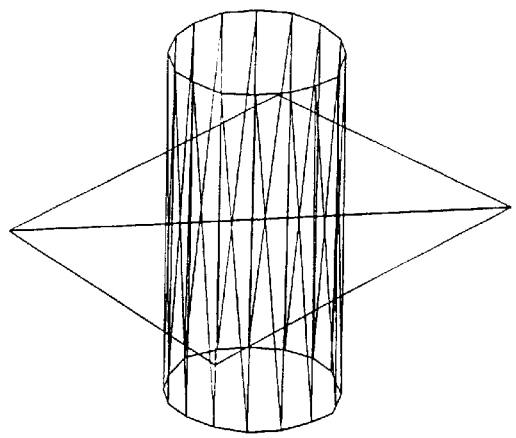
Figure 1C:
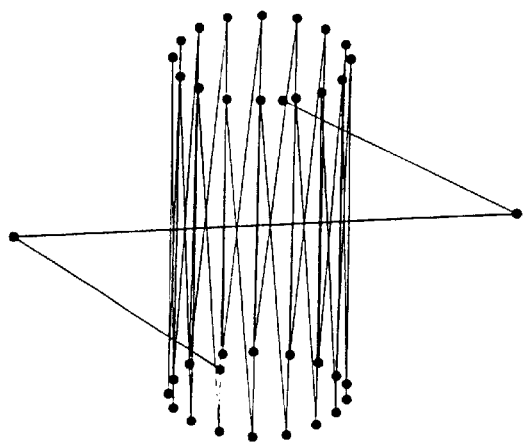

If a surface requires many triangles for an acceptable approximation, the result will be many connected triangles. See for example, FIG. 1(b), which shows an approximation of a cylinder and a square formed by nothing but triangles. These connected triangles can be efficiently represented by triangle strips. A triangle strip is a sequence of three or more vertices in which every consecutive set of three vertices defines a triangle. A triangle strip of n vertices thus defines a connected strip of n-2 triangles. The triangle strip version of FIG. 1(b) is shown by FIG. 1(c).

If the apparatus of FIGS. 2–3 is used (graphics processing system 100), this step is performed by polygon approximator 14 and the resultant triangle strips are stored in list 16.

S2: In this step, the triangle strips are ordered by minimum scan line extent for the current scan direction. The minimum scan line extent is the first scan line which crosses any triangle in a triangle strip, and is therefore likely to be different for each scan direction. Since a triangle strip is just a list of vertices, the minimum extent is the first scan line beyond the minimum vertex for the strip. For example, if the current scan direction is horizontal from lower y coordinates to higher y coordinates, and a vertex Vymin is the vertex of the triangle strip with the smallest y coordinate, the minimum scan line extent for that triangle strip would be the scan line with the smallest y coordinate greater than Vymin.

The triangle strips need not be physically reordered, as it is sufficient to maintain a list of which triangle strips go with each scan line extent. This list is used to eliminate entire triangle strips from consideration when evaluating scan lines by acknowledging that no triangle in a triangle strip can cross a scan line if the scan line has not yet reached the minimum extent of that triangle strip.

S3: In this step, a scan line counter, such as scan line counter 28, is initialized to point to the first scan line of the first scan direction. Herein, the current scan line is referred to as "C" and the coordinate of the current scan line is referred to as "Cpos" (Cpos is a y coordinate value for horizontal scans and an x coordinate value for vertical scans.)

If graphics processing system 100 is used, segment list memory 48 is also initialized at this point.

S4: The list generated in step S2 is queried to determine which, if any, triangle strips have a minimum extent of scan line C, indicating that the triangles in those strips should now be considered as possibly intersecting the current scan line. Those triangles are then separated from their strips and placed on a list of candidate triangles.

If graphics processing system 100 is used, this step is performed by candidate triangle extractor 18 and the candidate triangles are stored in list 20.

Figure 5:
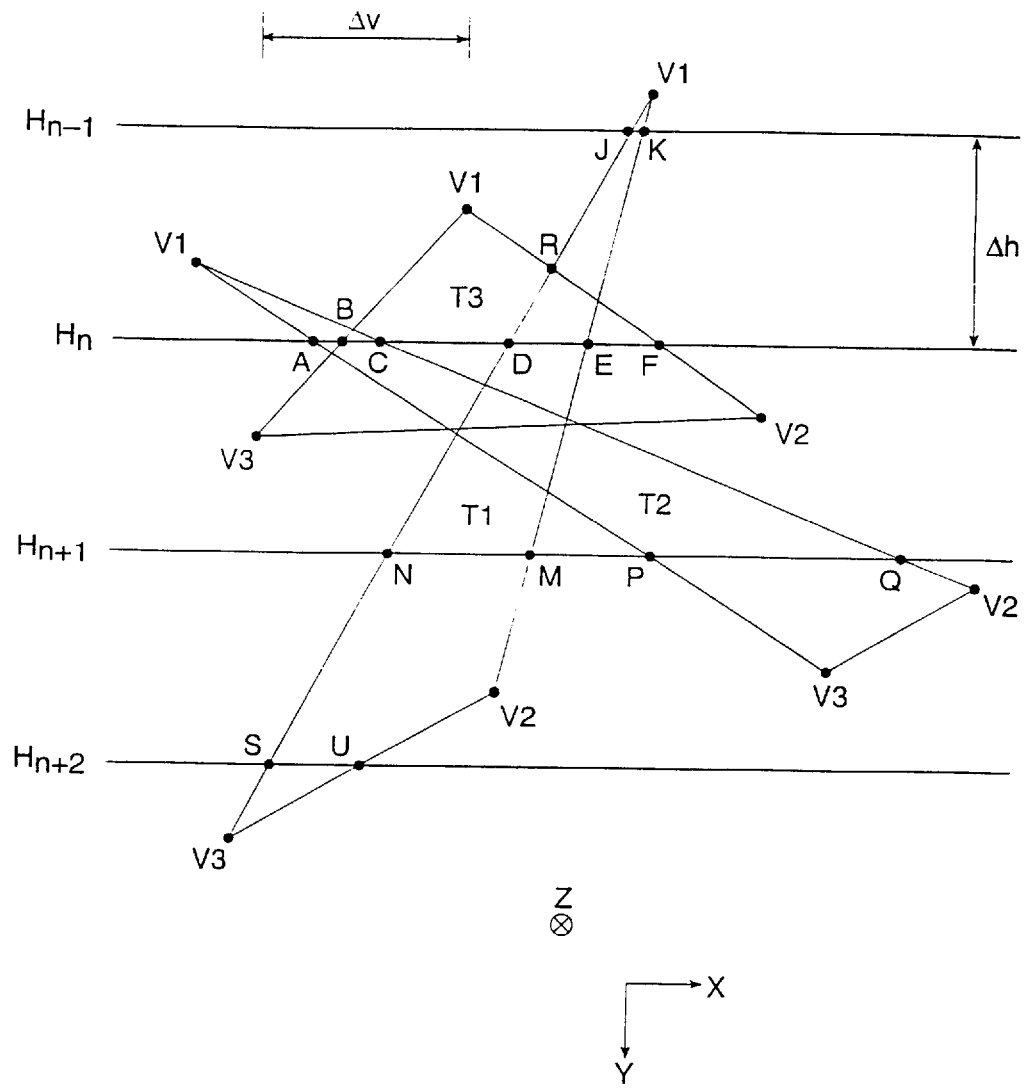
FIG. 5 is an illustration of the scanning process.

Each extracted triangle is represented by its three vertices. These vertices are sorted such that V1 is always the first vertex encountered, V2 is the next one, and V3 is the last vertex encountered. Depending on the triangle, the vertices might be different for each scan direction. For example, see FIG. 5, which illustrates the scanning process. In FIG. 5, triangle T2 is shown with vertices V1, V2 and V3 ordered for a horizontal scan. In a vertical scan with lower coordinate values being on the left, the labels for the vertices V2 and V3 would be swapped.

S5: In this step, each triangle in the list of candidate triangles which has a vertex V1 less than or equal to Cpos is placed on the list of active triangles. As should be apparent, C is the first scan line which could intersect such triangles.

S6: In this step, each triangle in the list of candidate triangles which has a vertex V3 less than Cpos is deleted from the list of active triangles, since those triangles cannot be intersected by any further scan lines. Steps S2, S4, S5 and S6 can be replaced with a one-time conversion of triangle strips to active triangles, but these steps ensure efficient memory usage as triangle strips are expanded only when needed, triangles are considered only when needed, and triangles are deleted once they no longer need to be considered.

If graphics processing system 100 is used, steps S5 and S6 are performed by active triangle selector 22, which transfers triangles from list 20 to list 24 as part of step S5 and removes triangles from list 24 as part of step S6. Of course, the moving and deletion could be logical instead of physical. An advantage to the above steps is that all the triangles need not be in memory at once, only those that intersect the current scan line.

S7: Once a list of the active triangles is determined, a segment list is generated for the current scan line. The list of active triangles is the list of all the triangles which intersect the current scan line, or more precisely, each triangle whose projection overlaps the current scan line. A segment is the portion of the scan line overlapped, and for each segment, the segment list maintains two end points, an object identifier indicating the object to which the intersecting triangle belongs, and a triangle identifier if necessary. The segments on the list are determined without reference to whether they are overlapped, eclipsed or split by other segments from other triangles. Although the horizontal scan lines and the vertical scan lines form a grid, the resolution of the end points for a horizontal scan is not controlled by the vertical scan resolution, and vice versa. Instead, the end points are calculated at full resolution, such as single or double floating point precision.

If graphics processing system 100 is used, the segment list is generated by scan line segmenter 42 from intersecting triangles read from list 24 of active triangles.

S8: In order to efficiently process the segment list, the segments are ordered according to optimization rules. The stree( ) process inputs a list of ordered segments and this ordered list is searched during the stree( ) process. For quick searching, the segments are placed in a binary tree. However, with conventional binary tree loading a sequential load of ordered elements will result in an uneven tree. Since uneven trees increase average search times, the tree balanced by reordering the segments. As an example, suppose the segment list contains 64 entries, labelled 0 to 63. The segments are fed into the stree( ) process ordered as follows: 32, 16, 48, 8, 24, 40, 56, etc. Another way of describing this ordering is that the labels are expressed in binary and the segments with labels having greater numbers of "0"'s to the right of the first "1" go first.

Another optimization rule is to order segments in the segment list with segments from previously visible triangles first. A previously visible triangle is one which contributed a visible segment for the previous scan line.

S9: The optimized segment list is then processed to determine which segments are visible, resulting in a list of visible segments. The list of visible segments is not necessarily a subset of the segment list with the totally obscured segments deleted, since some segments are partially obscured. If a segment is partially obscured from one point on the line segment to the end of the segment, the corresponding visible segment is one with one end point moved toward the other. If a segment is partially obscured from one point within the segment to another point within the segment, then two segments result.

This is best illustrated with an example. FIG. 5 shows three triangles T1, T2 and T3. Suppose the current scan line is $H_n$. The segment list contains AC (T1), DE (T2) and BF (T3). Suppose further that T1 is in the plane z=1, T2 is in the plane z=2, T3 is in the plane z=3 and the view plane is z=0. In this example, then, T3 is obscured by T1 and T2 and T2 is obscured by T1. Therefore, the visible segment list for the current scan lines is AC (T2), CD (T3), DE (T1) and EF (T3). The background is handled either by a special case or the placement of a large, flat object of a background color at a plane z=zmax.

If graphics processing system 100 is used, this step is performed by visible line segment generator 44. The function stree( ) for performing this operation is detailed below.

In the stree( ) process, each new segment added to the tree is compared to the segments in the tree. However, since the tree is ordered by end point, the process can quickly determine which visible segments already in the tree are touched by the new segment. Since the visible segments do not overlap, all that is needed is to look for segments which have one end point between the two end points of the new segment.

The new segment will be discarded if it is completely hidden (as determined by comparing z values of end points) by segments already in the tree. Otherwise, it will be entered and other segments it obscures will be removed. If the new segment is only partially obscured or obscuring, no segments will be deleted, but end points will be moved. Also, if a segment is obscured only internally and not at its end points, the segment is replaced by two segments. An example of how two segments result from one is shown in FIG. 5. Ignoring the effects of T2, segment BF would be divided into two segments, BD and EF upon the introduction of the segment DE into the tree.

Plane intersection is taken into account when a new segment is tested against the tree. For example, if the new segment's end points define a range of z values which overlaps a range of z values for an existing segment and the new segment overlaps the existing segment on the scan line, an intersection point might exist. Intersection points can be quickly calculated for two line segments, and if an intersection point is found, the new segment is split into a visible portion (the portion in front of the existing segment) and an invisible portion. The visible portion is stored on the tree and the invisible portion is discarded.

Figure 1D:
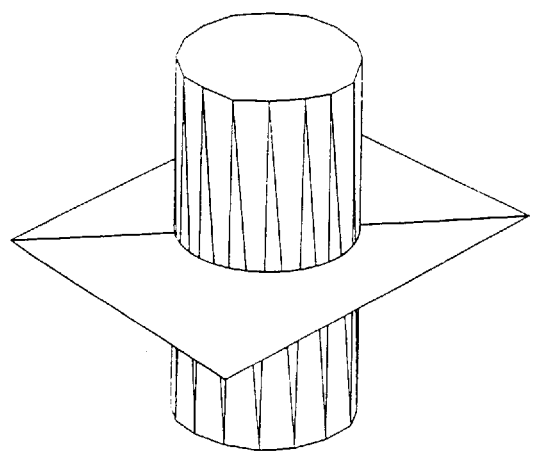
Figure 1E:
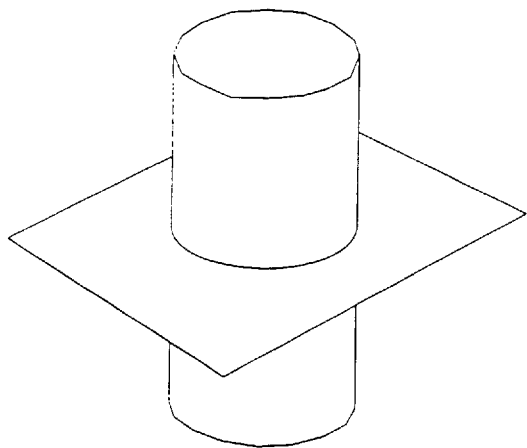

If an object was broken into multiple triangles and the boundaries of the triangles are not of interest, they can be eliminated in this step. As an example, FIG. 1(d) shows two objects with the boundaries of the triangles and FIG. 1(e) shows the boundaries removed, leaving only the boundaries of the objects. To effect this, two visible line segments are combined into one where they are adjacent (i.e., they have a common end point), have the same object ID, and the common end point has the same z coordinate in each segment. The latter requirement is necessary so that when an object blocks itself (for example, viewing a corrugated surface from near its edge), the line between one part of the object and another part is not eliminated.

If the assumption of segment linearity in the z direction is to be made in a later step, such as a shading step, then intra-object line elimination might be put off until linearity in z is no longer needed.

S10: In this step, the visible segment list generated in step S9 for the current scan line is used to build a visible line list. The visible line list indicates which visible lines have been found up to the current scan line. The visible line list contains lines which separate objects, as well as end points which signal the start of a visible line. A line cannot skip a scan line and still be considered a single line, so all the non-line end points are associated with the most recently processed scan line. The visible lines are created by connecting end points from one scan line to end points on adjacent scan lines.

The visible line list is initially empty. When the first scan line is processed, the end points of the visible segments for that scan line (assuming there are visible segments crossing that scan line) are added to the visible line list as end points of visible lines. No visible lines are defined at this point, since a line requires at least two points. As used here, a visible line can have more than two points defining it and it does not have to be perfectly straight. The deviation from perfect straightness could be caused either by round-off error or a visible line could be bent when the triangle it bounds is clipped by another triangle.

The processing of the next scan line results in another visible segment list. The end points of this new visible segment list are compared to the end points which are already on the visible line list. If an end point in the new visible segment list matches up with an end point in the prior visible segment list, the points are connected as a visible line. If an end point on the scan line does not match up, it is added to the visible line list as an end point (it might be the beginning of a new visible line). For two end points on adjacent scan lines to match up, their positions along their respective scan lines (x coordinate for the horizontal scan, y coordinate for the vertical scan) must be within an orthogonal scan line width ($\Delta v$ for the horizontal scan, $\Delta h$ for the vertical scan) of each other. To match up, the end points must also be associated with the same triangle. For example, in the horizontal scan, the end points must be the left end points for the same triangle or the right end points for the same triangle. With a single scan process, the requirement that the positions of the end points match within an orthogonal scan line width is not used.

As each subsequent scan line is processed, the visible segment list for the current scan line is used to extend the visible lines or add unmatched end points to the visible line list.

As an example, refer again to FIG. 5. If $H_{n-1}$ is the first scan line, the visible line list is empty until the end points J and K are added to the visible line list. Since information about which triangle they belong to is still needed, the end points might be stored as segments. When the next scan line, $H_n$, is the current scan line, the new visible segment list is AC (T2), CD (T3), DE (T1) and EF (T3). Since J and D have x coordinates within $\Delta v$ of each other, are both end points on the same triangle (T1), and are end points on the same side of T1 (left), they match and form a visible line. Since K and E are within $\Delta v$ of each other and are on the same side (right) as each other and on the same triangle (T1) as each other, they also match and form a visible line. The other end points on the current scan line (A, C, F) don't match, so they are added to the visible line list as end points.

In the example of FIG. 5, the scan lines are much farther apart than they should be given the triangles being processed. This is done to clarify the concepts involved, and in practice more scan lines would intersect the typical triangle. For the triangles in FIG. 5, the next scan line results in the segment list NM (T1) and PQ (T2), and MP if the background is tracked. Because of the position of end points P and Q, the end points A and C are never matched. Because T3 does not extend to $H_{n+1}$, F is also never matched. However, N is matched with D, and M is matched with E. AP and CQ are not visible lines since their x coordinates (A to P and C to Q) differ by more than $\Delta v$. If one of AP and CQ differed by more than $\Delta v$ and the other differed by less, the one that differed by less would be added to the visible line list with the assumption being that the other is added to the list when scanning in the other direction.

In the next scan line, S is matched with N, and U is matched with M. Thus, in the horizontal scan, only the lines JDNS and KEMU are generated. In the vertical scan, other lines are generated but at the resolution shown some lines are missed.

If visible segments from common objects were combined in step S9, then those end points aren't available for generating visible lines, so intra-object lines do not appear.

S11: As the visible lines are generated, such as JDNS and KEMU, the visible line list can be simplified by thinning. A thinning process recognizes that J, D, N and S are collinear and replaces JDNS with JS. The thinning process also recognizes that K, E and M are collinear, but U is not, and replaces KEMU with KMU. The test for collinearity simply checks whether a third point is within a small tolerance of a line defined by two other points. Since the points are equally spaced in one direction, only the position on a scan line need be checked. For example, to test whether D, J and N are collinear, the x coordinates are compared. If the difference between D and J is within a tolerance of the difference between D and N, the points are deemed collinear and D is eliminated. The tolerance might be zero but for round-off error.

Another way to simplify the visible line list is to eliminate intra-object lines, if the end points causing these lines are not already eliminated in step S9.

If unmatched end points exist which don't contribute any visible lines, they can be removed to save memory.

For proper display of an image, it is frequently necessary to know or assign a visible line segment to one of the two objects the visible line segment divides. For example, in FIG. 5, the line segment DR divides T1 and T3 (DR is used for an example only—it is not a line segment that would be generated by the scanning process as R is not on a scan line). If the lines are to be colored according to which object they belong, DR should be assigned to either T1 or T3. Since T1 is "in front" of T3, DR should be assigned to T1. The object to which a visible line belongs is determined from the z value of the end points of the visible segments which were used to generate the visible line.

S12: After the visible line list is updated, the scan line counter is incremented.

S13–S15: At step S13, the scan line counter is checked. If the last scan line has been processed, the program flows to step S14, otherwise the program loops back to step S4 to process the next scan line. At step S14, if the last scan direction is complete, the program flows to step S16, otherwise the scan counter is reset at step S15 and the scan axis is changed. If, for example, the process is a two-pass scan process with a horizontal scan followed by a vertical scan, step S15 is performed at the end of the horizontal scan.

S16: In this step, the visible line list is output as the visible line segment table.

In summary, the process just described scans an image formed by a set of objects, first by horizontal scan lines, then vertical scan lines, to find visible lines. The visible lines delineate the visible boundaries between objects in the set. Those objects are represented by one or more triangles. At each scan line, the triangles which intersect the scan line are examined to determine the extents of the line segments which intersect the scan line. These extents are further examined to determine which of them are visible, keeping in mind that there might be more visible segments than segments overall, due to splitting and overlap. Because this method determines all visible boundaries of the objects (down to the resolution of the scan lines), this method also provides object surface intersection lines at no additional cost. In addition, because the position of each segment along the scan line is known, and visibility is determined independently for each scan line, a segment does not have to be compared with a long list of other segments to determine visibility.

Although the above describes a serial process, the process of determining hidden lines can be implemented as a parallel process. For example, in a multi-threaded operating system, the process of triangle separation can be done as one thread, the active triangle selection as another, the determination of visible line segments as another, and the determination of visible lines from the visible line segments as yet another. Alternatively, the horizontal scans can be performed by one thread and the vertical scans by another.

FIG. 5 is an illustration of a horizontal scan. A horizontal scan is so named because the scan lines are horizontal. Thus, the progress of the horizontal scan actually runs vertically, from top to bottom. Four scan lines are shown ($H_{n-1}$ to $H_{n+2}$). Those scan lines cross the three triangles shown (T1, T2, T3). FIG. 5 also shows various points of intersection of scan lines and triangles. Strictly speaking, in a three-dimensional space, if the triangles are not coplanar it is not likely that they will all intersect the scan lines. However, as used herein, it is to be understood that intersection of a scan line and an object refers to the intersection of scan line and the projection of the object onto a view plane (either a perspective projection or a parallel projection).

Each triangle is shown with three vertices, V1, V2 and V3. The vertices are ordered when the triangles are extracted from triangle strips, or before they are added to the list of active triangles, so that a test of whether or not a triangle intersects a scan line can be easily determined by examining V1 and V3. For a horizontal scan line to intersect a triangle, the x value for the scan line must be between the x values for V1 and V3, inclusive. Where V1 is equal to V3, the triangle is a zero area triangle, since V2 must then be collinear with V1 and V3. Zero area triangles can be ignored or processed as other triangles.

Several intersection points are shown, such as A, B, C, D, E, F, N, M, etc. A line segment is defined by two end points and a line segment is associated with a triangle and an object. A visible line segment is a visible portion or entirety of a line segment. Each end point is characterized by a three-dimensional value; however, for a given horizontal scan line, only the x and z values need be specified, as the y value is determined by the y value of the scan line. Each end point is also a point on a boundary between two or more objects.

According to the terminology used above, AC, DE and BF are line segments of scan line $H_n$ and AC, CD, DE and EF are the visible line segments for that scan line (T3 is behind both T1 and T2). For scan line $H_{n+1}$, the line segments are NM and PQ, and both line segments are fully visible. Because D and N belong to the same object (T1) on the same side (left) and have x values within $\Delta v$ of each other, and E and M also belong to the same object and have x values within $\Delta v$ of each other, DN and EM define visible lines.

The scan line spacing, $\Delta h$, in FIG. 5 is exaggerated so that the examples discussed herein are clear. However, for an actual scan, the scan spacing would be much smaller relative to the objects being scanned. For example, in order to clearly handle the boundaries of T3, that triangle should be crossed by more than one scan line.

The above description is illustrative and not restrictive. Many variations of the invention will become apparent to those of skill in the art upon review of this disclosure. For example, the above description describes a two scan method for locating visible lines, but a one scan method is also possible. The scope of the invention should, therefore, be determined not with reference to the above description, but instead should be determined with reference to the appended claims along with their full scope of equivalents.

What is claimed is:

1. A method for visible line determination using a programmed circuit, wherein visible line determination is a process of determining which lines, or segments thereof, of which objects in an object table are visible from a view point where the view point and the objects are specified by coordinates in a coordinate space of two or more dimensions, the method comprising the steps of:

defining a scan line spacing relative to the objects in the coordinate space;

positioning a plurality of scan lines over the objects at the scan line spacing;

for each scan line, performing the following steps:

a) determining the objects which are crossed by the scan line, resulting in a list of scan line segments, wherein a scan line segment in the list of scan line segments is a portion of the scan line which is bounded by intersecting edges of an object crossed by the scan line, wherein each intersecting edge is associated with a visible line or a segment of a visible or invisible line;

b) determining visible scan line segments from the list of scan line segments and distances of the scan line segments from either the view point or a view plane; and c) matching the visible scan line segments for the scan line with the visible scan line segments from a prior scan line to determine segments of visible lines, a segment of a visible line extending over at least two scan lines and defining a visible boundary between two objects; and outputting the segments of visible lines as a visible line table indicating which lines, or segments thereof, of which objects in the object table are visible from the view point.

2. The method of claim 1, wherein the coordinate space is a three-dimensional space.

3. The method of claim 1, wherein the coordinate space is a two-dimensional space with an added dimension to indicate overlap of objects in the coordinate space.

4. The method of claim 1, wherein all the objects are either polygons or are represented by a finite number of polygons.

5. The method of claim 4, wherein all the polygons are triangles.

6. The method of claim 4, further comprising the step of removing all visible lines or segments of visible lines which divide multiple polygons used to represent a single object.

7. The method of claim 1, wherein intersecting lines are lines whose projections meet at a point.

8. The method of claim 1, wherein the view point is infinitely far from the objects, thereby providing a parallel projection of the objects onto the view plane.

9. The method of claim 1, further comprising a filter step wherein objects which do not intersect a current scan line are not considered during the steps associated with the current scan line.

10. The method of claim 1, wherein the image is scanned in a horizontal direction and a vertical direction and the step of matching visible scan line segments is a step of matching visible scan line segments only when the end points of the matching visible scan line segments differ by less than a threshold.

11. The method of claim 10, wherein the threshold is a vertical scan spacing during a horizontal scan and the threshold is a horizontal scan spacing during a vertical scan.

* * * * *